United States Patent [19]

Danton

[11] 4,423,102
[45] Dec. 27, 1983

[54] COVERING STRUCTURE FOR SEATING OR THE LIKE

[75] Inventor: Jean-Louis Danton, Boulogne, France

[73] Assignee: Etablissements M. Duret & Fils, France

[21] Appl. No.: 376,948

[22] Filed: May 11, 1982

Related U.S. Application Data

[63] Continuation-in-part of Ser. No. 16,341, Feb. 27, 1979, abandoned.

[51] Int. Cl.³ .................... B32B 3/10; B32B 5/18; B32B 5/24; B32B 7/04
[52] U.S. Cl. ......................... 428/92; 5/481; 428/256; 428/317.9; 428/911
[58] Field of Search .............. 5/474, 475, 481; 428/213, 222, 247, 256, 304.4, 309.9, 311.1, 311.5, 314.4, 314.8, 316.6, 318.4, 318.6, 371, 377, 457, 911, 317.9, 86, 88, 92, 319.1

[56] References Cited

U.S. PATENT DOCUMENTS

| | | | |
|---|---|---|---|
| 2,220,577 | 11/1940 | Menge | 5/476 |
| 2,785,440 | 3/1957 | Toulmin | 264/46.4 |
| 2,901,756 | 9/1959 | Moule | 5/459 |
| 3,049,730 | 8/1962 | Wall et al. | 5/475 |
| 3,133,830 | 5/1964 | Jochinke | 428/318.4 |
| 3,336,180 | 8/1967 | Werner | 428/318.6 |
| 3,399,107 | 8/1968 | Biskup et al. | 428/318.6 |
| 3,593,848 | 7/1971 | Landau | 428/319.1 |
| 3,644,168 | 2/1972 | Bonk et al. | 428/315.7 |
| 3,647,608 | 3/1972 | Enlow et al. | 428/319.1 |
| 3,697,126 | 10/1972 | Tiffin et al. | 428/314.8 |
| 3,717,530 | 2/1973 | Case et al. | 428/76 |
| 3,813,281 | 5/1974 | Burgess et al. | 428/316.6 |
| 4,031,579 | 6/1977 | Larned | 297/DIG. 5 |
| 4,075,722 | 2/1978 | Rinard | 5/481 |
| 4,154,786 | 5/1979 | Plasse | 264/46.4 |
| 4,162,393 | 7/1979 | Balboni | 5/459 |

*Primary Examiner*—William J. Van Balen
*Attorney, Agent, or Firm*—Scully, Scott, Murphy & Presser

[57] ABSTRACT

A resilient furniture covering for seats or similar equipment is disclosed which comprises an outer covering layer consisting of a dense, relatively thick material presenting little elasticity but good flexibility, a resilient network formed by a continuous layer of spiral metallic springs reinforcing the outer cover and an intermediate connecting layer bonding the outer cover and the network and consisting of a foamed plastic material adhering on one side to the outer layer and at least partially enveloping the spring spirals of the network. Optionally there may additionally be provided an intercalating layer comprised of a fiberglass fabric situated between the covering layer and connecting layer.

13 Claims, 4 Drawing Figures

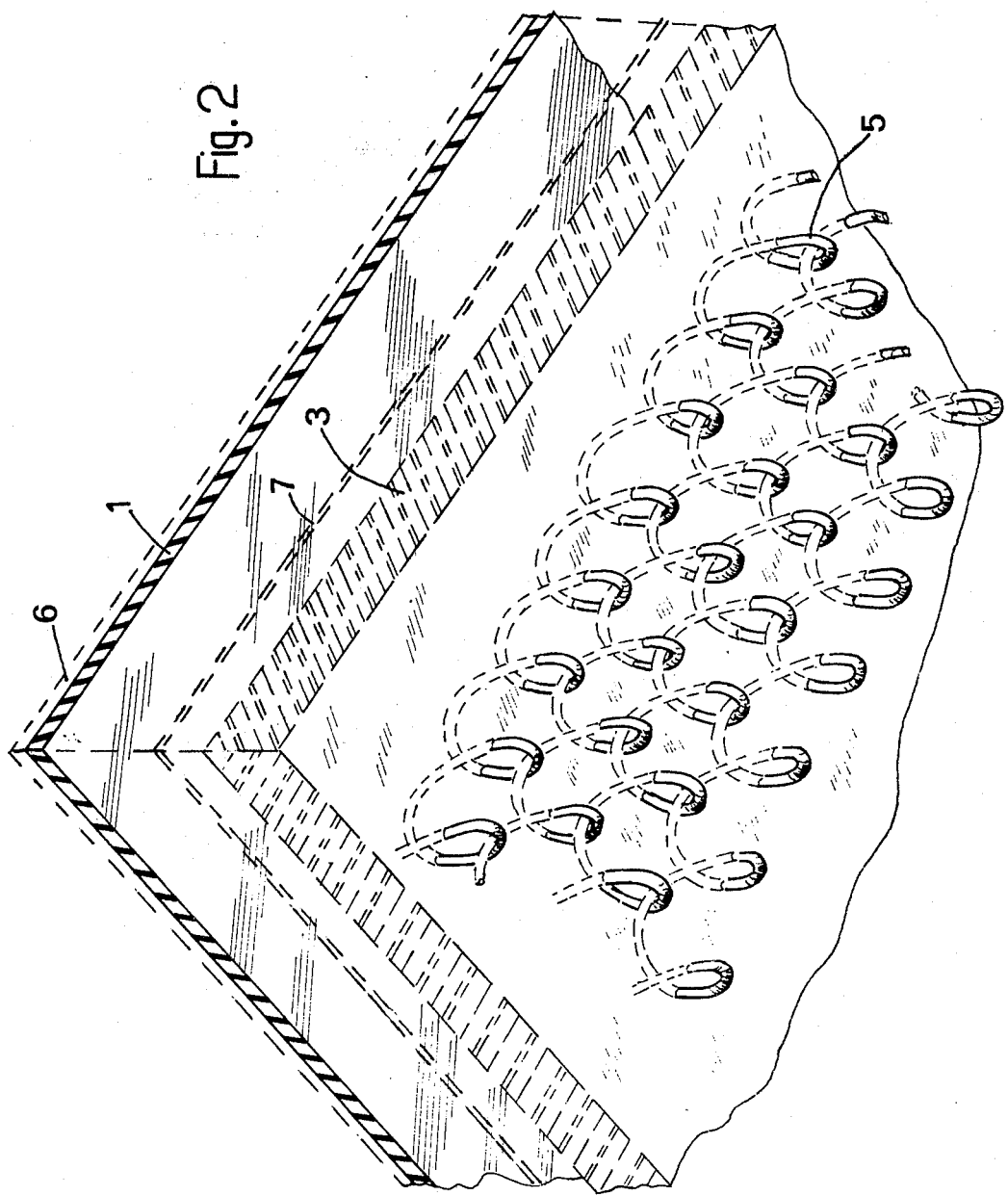

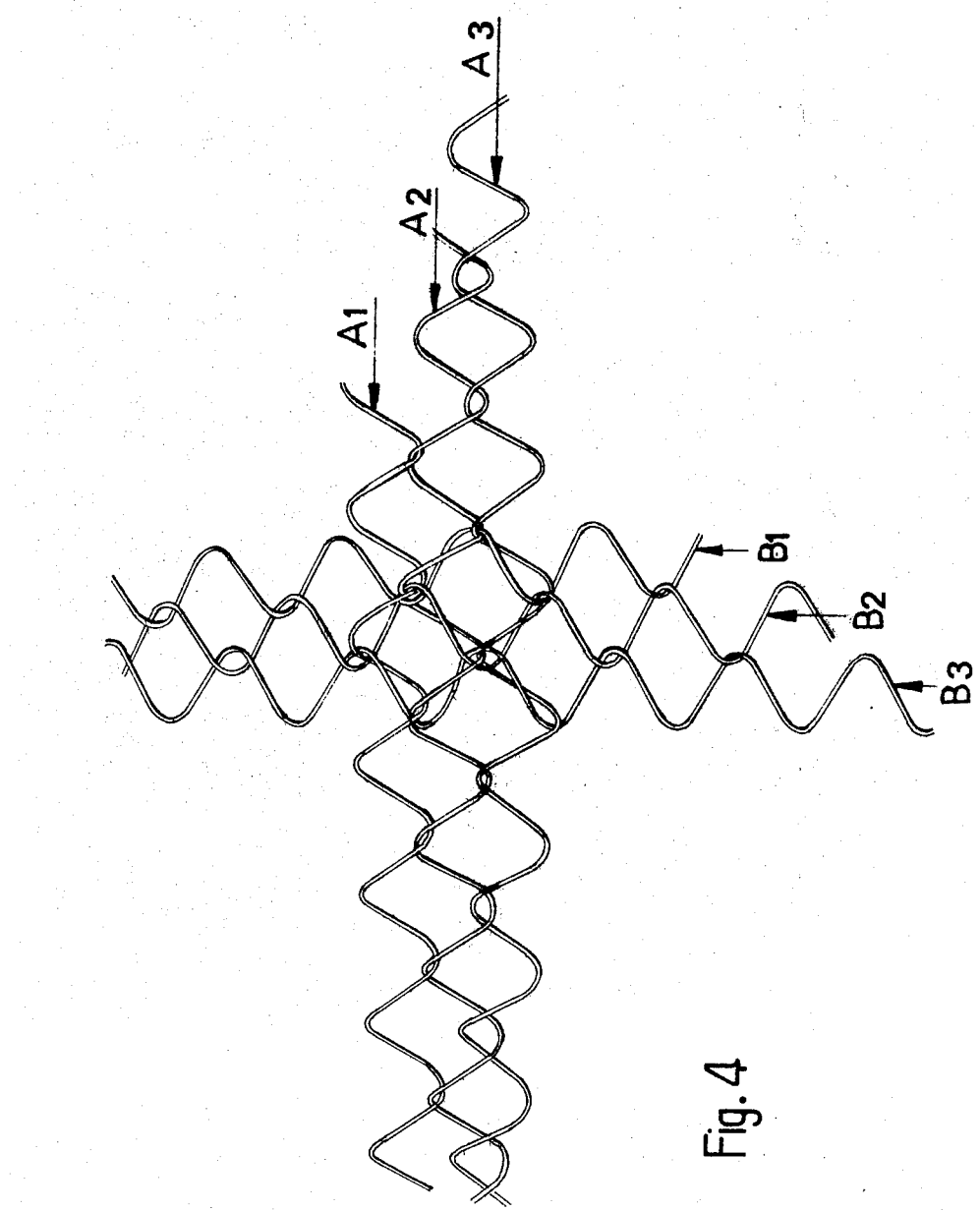

COVERING STRUCTURE FOR SEATING OR THE LIKE

This application is a continuation-in-part of Ser. No. 016,341, filed Feb. 27, 1979, abandoned.

The present invention relates to a resilient furniture covering which is especially adapted, but not exclusively limited to, seats or similar equipment employed in public locations and, more particularly, in public transportation vehicles.

In effect, it has been noted that during constant usage, the seats which are installed in public buildings or public transportation vehicles are frequently subjected to acts of vandalism and, as a result, are often found in a dilapidated condition so as to be rendered unfit for use.

Thus, for instance, the coverings of seats employed in public use are very frequently ripped or lacerated by means of knives, blunt or sharp objects and, as a consequence, must be frequently replaced.

It is presently known that such furniture coverings comprise, in general, an outer covering of fabric or of a plastic material which, in turn, covers a resilient padding or stuffing constituted, for example, of horsehair, kapok or a foamed plastic material and, according to the thickness and the type of seat under consideration, is supported on either a rigid base, or on some rigid straps mounted on a frame, or even on a spring assembly.

It is apparent, from its properties and its thinness, that the material serving as the outer covering cannot withstand the tearing action of a sharp object and that, due to its very nature, the stuffing which is even less resistant to such an attack, renders it easy for the object to penetrate therethrough.

Such is especially the case in the seating structures described in U.S. Pat. Nos. 3,049,730 (J. F. Wall, et al.) and 4,075,722 (Rinard).

These structures, such as shown especially in FIG. 1 of U.S. Pat. No. 4,075,722 and in FIG. 9 of U.S. Pat. No. 3,049,730, are composed of a thick foam cushion in a plastic material covered over by a layer of covering consisting of a film of dense plastic material, the assembly being supported by a network of flat springs, optionally sinusoidal, fixed to a peripheral support frame, this network being completely embedded in the lower part of the foam cushion made of plastic material.

The drawback of these structures consists in that they are easily torn with the help of a cutting instrument such as a knife. In fact, even if a covering layer is provided which is resistant to tearing, as is the case in U.S. Pat. No. 3,049,730, this resistance will remain insufficient to neutralize the action of a cutting object such as a knife, and this, all the more so as the layer of covering has to be relatively thin, by reason of the seat's makeup (the covering layer is supported only by the cushion made of foamed plastic material).

Consequently, at the time of laceration, the cutting object will produce a slash in the covering layer and will deeply drive into the cushion without anything being able to stop it. Nothing will limit the length and depth of this slash (the network of flat sprins being too far apart from the covering layer to be able to have an effective action to prevent the laceration).

Furthermore, it is shown that in this type of structure, the layer of foam exerts a slight pressure upon the layer of covering. Consequently, this layer of covering will be submitted to a tension which will have for an effect to pull apart the two lips of the slash produced by the laceration. The seat, therefore, becomes unserviceable.

In addition, the seating structures previously described present a serious drawback owing to the fact that the elastic network, supporting the cushion, is completely embedded in the foamed plastic material. As a matter of fact, in course of time, deterioration of the foam at the level where the network is embedded (shearing of the foam at the time of the network's flexions) will be observed. Furthermore, in the case where the foam is relatively dense, a notable lessening in the flexibility of the elastic network will be observed.

The invention has now more particularly for its purpose the production of a furniture element especially designed to resist the even deliberate laceration (for example, with the help of a cutting instrument such as a knife) and which yet possesses good flexibility, so as to be able to produce seats presenting good comfort.

To achieve this, this furniture element calls into play three very distinct elements, namely:

(1) A covering layer made of a relatively thick, dense, plastic material which, by reason of its thickness and denseness, make up a first obstacle to laceration. This layer which is not submitted to any effort whatsoever in tension, presents low elasticity in its plane but good flexibility.

(2) A network, formed by a continuous layer of spiral (helicoidal) metallic springs whose axes are parallel to the covering layer made of dense plastic material, and whose spirals are interlaced with each other, so as to obtain, seen in plane view, a structure in the form of a not very stretchable method checkerboard, making it possible to stop the penetration and progression of a cutting object (the springs not being able to move apart to allow passage of said object), the spirals of said springs noticeably coming on one side to be flush against the lower face of the covering layer.

(3) An intermediate connecting layer between the covering layer and the layer of springs, this covering layer being made in a plastic foamed material with a thickness less than the diameter of the spring spirals of said spring layer, and adhering on one side upon the lower face of the covering layer made from the dense plastic material and coming in part to embed the spirals of the spring layer (over a fraction of the thickness of the spring layer).

It is clear that, in such furniture, flexibility can be varied in modifying the diameter of the spring wires and the diameter of the spirals. In way of an example, a diameter of wire from 0.5 to 1.5 mm and a diameter of spirals from 10 to 20 mm can be advantageously utilized.

Preferentially, the spring spirals are embedded into the intermediate layer of foamed plastic material over ½ to ⅔ of their diameter. Below 50%, the spring layer will have a tendency to come apart. Above 80%, the wire springs risk ruining the foam.

One characteristic of the furniture covering according to the invention resides in the fact that it combines, in a very special way the flexibility of the covering layer made of dense plastic material and the flexibility of the spring layer.

In effect, if flexion of the furniture covering is caused, the latter will oppose a return force which will tend to bring it back to its initial position, this return force consisting in the resultant of the flexibility of the plastic material covering layer and the elasticity of the spiral spring part which is not embedded in the intermediate layer of foamed plastic material. This property presents an important advantage, namely, if a slit is made in the covering layer, for example, by a knife, this slit will tend to close up owing to flexibility in the furniture covering assembly and will remain, thereby, practically invisible.

In its most simple version, the spring layer is made up by a plurality of helicoidal springs with parallel axes arranged side by side, and whose spirals from each of the springs are intermixed with the spirals of the two springs which are adjacent to it. The intermixture of these spirals is obtained by making each of the springs turn around its axis so that it comes to fit into the spirals of the springs which are adjacent to it.

According to another embodiment of the invention, the layer of springs is formed by an intermixture of two layers of springs, such as the one previously described, the springs of the first layer being perpendicularly axed to the springs of the second layer. This solution especially presents the following advantages:

It makes it possible to obtain a greater density of spring spirals near the lower face of the covering layer, these spirals stretching out into two perpendicular directions and constituting a kind of checkerboard in relief. Therefore, better resistance to the laceration and penetration of a cutting object is thus obtained.

It makes it possible to obtain a spring layer in which the springs are self-maintained in position without necessitating the use of outside elements, which is not the case in the preceding solution, in which the springs can slightly move towards each other (variations of axial differences).

It makes it possible to maintain a better homogeneity in the flexibility of the spring layer assembly (same flexibility in the direction of the axes of the two intermixed spring layers).

According to another characteristic of the invention, the furniture covering element comprises, furthermore, between the covering layer and the foamed plastic material connecting layer, an intercalated layer in a few tenths of millimeters, for example, 6/10ths, in a fiberglass fabric. This intermediate layer upon which the tops of the spring spirals come to bear has several functions:

It facilitates the manufacture of the covering element, especially in the case where the plastic material of the covering layer and the connecting layer is produced in silicone elastomer or polyethylen.

It makes it possible to homogenize the mechanical stresses between the spring layer and covering layer.

It makes it possible to avoid a mosaic effect owing to the spring layer visible at the outer surface of the covering layer.

It makes it possible to increase the fire resistance of the covering element assembly.

The furniture covering element according to the invention can in addition comprise a covering in fabric, for example, in wool, covering over the upper face of the covering layer.

In the case where this fabric is of the velvet kind, it presents, in addition to comfort, the advantage of hiding any mosaic effect in the absence of the intercalated spring layer and to make a slit produced on the covering layer totally invisible (the velvet fibers masking entirely then the slit).

It is advisable to note that the covering layer and connecting layer are, preferably, produced from a plastic material of the same nature, for example, with a polyvinyl chloride, silicone elastomer or polyethylene base.

By way of example, in the case where the plastic material is in a PVC base, this plastic material can comprise:

PVC,
a common plasticizer,
mineral fillers,
a common fire resistant agent,
a thermal stabilizer making it possible to avoid the decomposition of the PVC at the pouring temperature,
and connecting the connecting layer of foamed plastic material, a foaming agent able to consist of azodicarbonamide by reason of two parts expansion agent for each 100 parts of PVC resin.

In the case where the plastic material is a silicone elastomer:

The covering layer can consist in Silastic Q 39 591 obtainable from DOW CORNING and, The connecting layer made of foamed plastic material can consist in Silastic GP 590 DOW CORNING with, as foaming agent, azodicarbonamide. It is advisable to note concerning that, in this case, the percentage of foaming agent ought not to exceed 2% because, beyond this percentage, it becomes an inhibitor to the vulcanization of the silicone elastomer (preferably it will be on the order of 1.25%).

The invention also concerns manufacturing processes for the furniture covering element previously described.

According to a first example, the manufacturing process comprises the following steps:

(1) The dense covering layer, for example, made of PVC, is poured at ambiant temperature, over a mold, the molding face able to present in relief a negative of a design to be obtained.

(2) The covering layer is prepolymerized in an oven, at a temperature in the order of 180° C. for a duration in the order of 3 to 5 minutes then it is left to cool so as to obtain a lowering of the material's temperature of about 50° C., for example, from 120° to 70° C.

(3) Next the connecting layer, for example, with a mixture of PVC and foaming agent is poured at the ambiant temperature.

(4) The continuous layer of springs is put on the liquid connecting layer. The spring layer then sinks into the connecting layer until it reaches the covering layer which has been prepolymerized and which is, by virtue of this fact, harder.

(5) Next the two layers of plastic material are polymerized in an oven at a temperature of 180° C. and for a duration of about 25 minutes.

(6) It is drawn from the oven and left to cool at an ambiant temperature before handling the furniture covering.

(7) Next the furniture covering elements are cut out in the forms and dimensions required. It is advisable to note that in the first step of the process previously described, the casting face of the mold can be initially covered over with fabric, produced with the help of a natural or synthetic material which is not liable to deterioration by the temperature of polymerization. In this case, furniture covering elements covered over in fabric are obtained.

According to a second example in executing the invention, the manufacturing process comprises the following steps:

(1) The covering layer, for example, in PVC or silicone elastomer is poured at ambiant temperature, the casting face of the mold able to present in relief the negative of a design to be obtained, or being covered over with a fabric.

(2) An intercalated fabric in fiberglass is set over this covering layer.

(3) The connecting layer of plastic material, (resin mixed with the expansion agent) is poured when cold.

(4) The continuous layer of springs is put over this liquid connecting layer. The spring layer then sinks into the connecting layer until it reaches the intercalated fabric in fiberglass.

(5) Next the two layers of plastic material are polymerized in an oven at a temperature of 180° C. and for a duration of about 25 minutes.

(6) It is drawn from the oven and left to cool at ambiant temperature before handling the furniture covering.

(7) Next the furniture covering elements are cut out in the forms and dimensions required.

Concerning the choice of plastic material used, it is advisable to note that:

The PVC solution presents the advantage of relatively low cost. Furthermore, a Shore hardness on the order of 80 can be obtained. On the other hand, the drawback of this solution resides in the fact that the problem in the release of noxious gas at the time of a fire cannot be solved.

The silicone elastomer solution presents the advantage of a much better resistance to fire (rating, emission of smoke, toxicity). However, its cost is higher and its maximum hardness, in the order of 50 Shore, is lower than that of PVC.

Embodiments of the invention will be described, hereafter, as non-limiting examples, with reference to the attached drawings in which:

FIG. 2 is a schematic view, in exploded perspective, of the element shown in FIG. 1.

FIG. 4 is a top view making it possible to illustrate the embodiment (intermixing) of the layer shown in FIG. 3.

Figure 1:
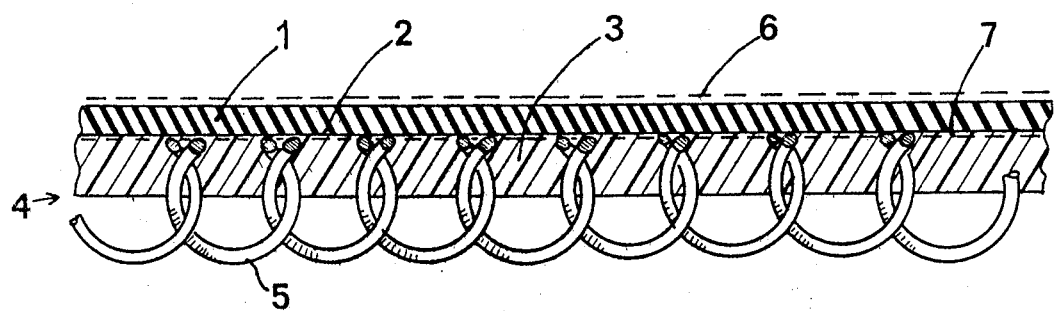
FIG. 1 is a schematic cross-section of a furniture covering element according to the invention in which the layer of springs is made up by a multiplicity of helicoidal springs with parallel axes.

As previously mentioned, the furniture covering element shown in FIGS. 1 and 2 comprise a covering layer 1 in dense plastic material such as silicone elastomers, polyethylene and dense polyvinyl chloride (PVC), for example, with a density in the order of 1.18 to 1.30, in Shore hardness from 40 to 98, this covering layer 1 being relatively thick, for example, on the order of 5 mm.

Lower face 2 of this covering layer 1 is joined together, by means of an intermediate foamed layer with the same plastic material 3, to a network 4 formed by a continuous layer of spiral metallic springs 5, with parallel axes between them and to covering layer 1.

The spirals of these springs 5 are intermixed with each other, as previously described, and are flush on one side against the lower face of covering layer 1.

These springs 5 can be made, for example, with steel wire with a diameter on the order of 5 to 15/10ths of a mm. The diameter of the spirals can therefore be comprised between 10 to 20 mm.

Intermediate level 3 can be made in a foamed plastic material (PVC, silicones, polyethylene), with a density able, by example, to vary from 1 to 1.25.

As previously indicated, thickness of this intermediate layer 3 is equal to ½ to ⅔ of the diameter in the spirals of springs 5, so that the spirals are only partially embedded in the foamed plastic material.

The furniture covering element previously described presents numerous advantages, both from the point of view of comfort and that concerning resistance to laceration:

In the first place, by reason of the relatively high thickness in covering layer 1 and the multiplicity of the spiral tops of springs 5 coming into contact with this covering layer 1, the user, in seating down will not feel the presence of springs 5.

Furthermore, at the time of an attempt of laceration, the cutting object which will first have great difficulty in penetrating into covering layer 1 by reason of its hardness and thickness, will next be stopped by the continuous network of springs 5 which comes flush against lower face 2 of covering layer 1.

Consequently, it will only very slightly reach foamed plastic material 3. In any case, the slit made will afterwards not be able to spread by itself. On the contrary, this slit will close itself up naturally owing to the flexibility of the spring layer and covering so that the attempt of laceration will have no serious consequence, necessitating repair or replacement of the covering.

It will be noted that the layer of PVC making up covering 1 can be advantageously fireproofed, which confers, by reason of its thickness, very good resistance to fire in the furniture covering assembly (Of course, intermediate layer 3 can also be fireproofed).

In case one of the metallic spirals making up network 4 breaks, the tip of this broken spiral will only with great difficulty be able to cross through the surface layer, which eliminates the risk of hurting a user.

It is recalled that in the examples shown in FIGS. 1 and 2, layer of springs 4 is formed by a multiplicity of helicoidal springs 5 with parallel axes perceptibly on a same plane. The spirals from each one of the springs 5 are intermixed with the spirals from two springs 5 which are adjacent to it. The intermixing of these spirals is obtained by making each of these springs 5 turn around its axis so that it comes to fit into the spirals of the springs which are adjacent to it (action similar to that of screwing).

Figure 3:
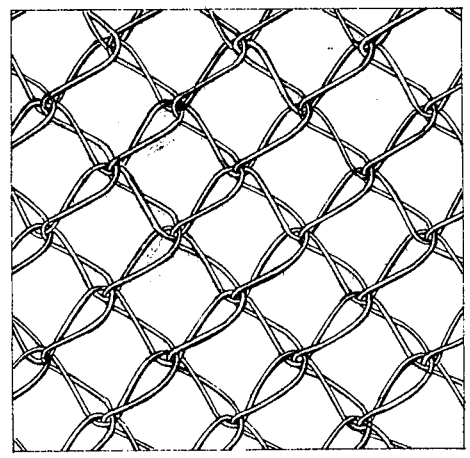
FIG. 3 represents, in top view, a layer of springs made up by an intermixing of two layers of springs with perpendicular axes.

The layer represented in FIG. 3 is obtained by intermixing two layers of springs of the type of the one previously described, the axes of the springs in the first layer being perpendicular to the axes of the springs in the second layer. It will be observed that this double intermixing makes it possible to accentuate, seen from above, the checkerboard configuration.

FIG. 4 makes it possible to illustrate the principle of this double intermixing. In this figure, for greater clarity, the first layer is formed only by three intermixed springs A1, A2, A3 while the second layer, perpendicularly axed to the first, is formed only by springs B1, B2, B3. At the intersection of these two layers, the pronounced checkerboard configuration shown in FIG. 3 will be found.

It is advisable to bear in mind that FIGS. 3 and 4 are viewed from above (in a plane) and do not make it possible to make the relief of the helicoidal springs stand out which musn't be confused with flat springs.

As previously mentioned, the furniture covering element according to the invention can in addition comprise, adhering on the upper face of the covering layer, a fabric covering, preferably woolen and, between the covering layer and the intermediate connecting layer, an intercalated layer in a fabric 6 of fiberglass 7 with a thickness preferably equal to about 6/10ths of a millimeter. The covering and intercalated layer have been shown in broken lines on FIGS. 1 and 2.

I claim:

1. Covering structure resisting laceration, especially for seating or the like, comprising:
   (a) a covering layer of a dense plastic material, relatively thick, presenting little elasticity in its plane but good flexibility;
   (b) a network formed by a continuous layer of spiral metallic springs whose axes are parallel to the covering layer of dense plastic material, and whose spirals are intertwined with each other so as to obtain, seen in plane view, a structure in the form of a meshed checkerboard, the spirals of said springs on one side being substantially flush against the lower face of the covering layer; and,
   (c) a foamed plastic material layer with a thickness less than the diameter of the spiral metallic springs layer, said foamed plastic material layer adhering on one side to a lower face of the dense plastic material layer with the spiral metallic springs layer being partially embedded in said foamed plastic material layer.

2. Covering structure according to claim 1 in which said spiral metallic springs possess a diameter of 10 to 20 mm and are constructed from wires of 0.5 to 1.5 mm diameter.

3. Covering structure according to claim 1 in which the spiral metallic springs layer is formed by a multiplicity of spiral springs with parallel axes arranged side by side, the spirals of each of the springs being intertwined with the spirals from two adjacent springs.

4. Element according to claim 1 in which the spring layer is formed by a multiplicity of helicoidal springs with parallel axes, arranged side by side, whose spirals of each of the springs are intermixed with spirals from the two springs which are adjacent to it.

5. Covering structure according to claim 1 in which the spiral metallic springs layer is formed by an intertwining of two such layers, the springs of the first layer being arranged perpendicularly to the springs of the second layer.

6. Covering structure according to claim 1 further comprising a fiberglass fabric layer a few tenths of a millimeter thick interposed between the dense plastic material layer and the foamed plastic material layer.

7. Covering structure according to claim 1 further comprising a fabric covering over the upper face of the dense plastic material layer.

8. Covering structure according to claim 1 in which the dense plastic material layer and the foamed plastic material layer are constructed of material of the same nature.

9. A covering structure according to claim 1 in which the network of spiral metallic springs is embedded in the foamed plastic material layer over ½ to ⅔ of their diameter.

10. A covering structure according to claim 1 wherein the dense plastic material is formed from a polyvinyl chloride base.

11. A covering structure according to claim 10 wherein the foamed plastic material layer is formed from polyvinyl chloride and a foaming agent.

12. A covering structure as claimed in claim 1 wherein said dense plastic material is formed from a silicone elastomer.

13. A covering structure as claimed in claim 1 wherein said foam plastic material is foamed from a silicone elastomer and a foaming agent.

* * * * *